United States Patent
Choi et al.

(10) Patent No.: US 11,355,813 B2
(45) Date of Patent: Jun. 7, 2022

(54) VENTING DEVICE AND METHOD FOR MANUFACTURING THE SAME

(71) Applicant: LG Chem, Ltd., Seoul (KR)

(72) Inventors: Yong Su Choi, Daejeon (KR); Sang Hun Kim, Daejeon (KR); Na Yoon Kim, Daejeon (KR); Hyung Kyun Yu, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/647,279

(22) PCT Filed: Jan. 23, 2019

(86) PCT No.: PCT/KR2019/000977
§ 371 (c)(1),
(2) Date: Mar. 13, 2020

(87) PCT Pub. No.: WO2019/245125
PCT Pub. Date: Dec. 26, 2019

(65) Prior Publication Data
US 2020/0212399 A1   Jul. 2, 2020

(30) Foreign Application Priority Data

Jun. 18, 2018 (KR) .................. 10-2018-0069451

(51) Int. Cl.
*H01M 50/317*  (2021.01)
*H01M 50/103*  (2021.01)
*H01M 50/333*  (2021.01)

(52) U.S. Cl.
CPC ....... *H01M 50/317* (2021.01); *H01M 50/103* (2021.01); *H01M 50/333* (2021.01)

(58) Field of Classification Search
CPC .... H01M 50/10; H01M 50/20; H01M 50/333; H01M 50/103; H01M 50/317
See application file for complete search history.

(56) References Cited

U.S. PATENT DOCUMENTS

| 4,931,368 | A  | 6/1990 | Ayers et al.   |
| 9,397,325 | B2 | 7/2016 | Kinuta et al.  |

(Continued)

FOREIGN PATENT DOCUMENTS

| CN | 103597631 A | 2/2014 |
| CN | 106340603 A | 1/2017 |

(Continued)

OTHER PUBLICATIONS

International Search Report from Application No. PCT/KR2019/000977 dated Apr. 22, 2019, 2 pages.

(Continued)

*Primary Examiner* — Kenneth J Douyette
(74) *Attorney, Agent, or Firm* — Lerner, David, Littenberg, Krumholz & Mentlik, LLP

(57) ABSTRACT

A venting device inserted into a sealing part of a pouch of a secondary battery according to an embodiment of the present invention includes: a housing inserted between confronting surfaces of the sealing part so as to be sealed together with the sealing part, the housing being made from a metal plate; a gasket made of a polymer and disposed in the housing and through which a passage is defined providing gas communication between an inside and an outside of the pouch; and a plate spring made of a metal, the plate spring being disposed in the housing and assembled with the gasket, the plate spring being configured to open and close the passage in response to a change in an internal pressure of the pouch, wherein the housing includes a crimping part crimped together with the gasket on an upper end of the housing.

8 Claims, 15 Drawing Sheets

(56) References Cited

U.S. PATENT DOCUMENTS

| | | | |
|---|---|---|---|
| 10,680,221 B2 | 6/2020 | Choi et al. | |
| 2004/0157115 A1* | 8/2004 | Bouffard | H01M 6/085 429/56 |
| 2006/0275665 A1 | 12/2006 | Hyung et al. | |
| 2009/0117459 A1 | 5/2009 | Hyung et al. | |
| 2011/0104523 A1* | 5/2011 | Lee | H01M 50/171 429/7 |
| 2012/0244399 A1 | 9/2012 | Tartaglia | |
| 2013/0130079 A1 | 5/2013 | Kako et al. | |
| 2014/0120387 A1 | 5/2014 | Kinuta et al. | |
| 2014/0356655 A1 | 12/2014 | Yoshino | |
| 2015/0004446 A1 | 1/2015 | Kim et al. | |
| 2016/0036024 A1 | 2/2016 | Choi et al. | |
| 2017/0033329 A1* | 2/2017 | Shin | H01M 50/124 |

FOREIGN PATENT DOCUMENTS

| | | |
|---|---|---|
| JP | H09285813 A | 11/1997 |
| JP | H11283598 A | 10/1999 |
| JP | 2003037028 A | 2/2003 |
| JP | 2004154789 A | 6/2004 |
| JP | 2006286624 A | 10/2006 |
| JP | 2015156322 A | 8/2015 |
| JP | 2016031934 A | 3/2016 |
| JP | 2017188465 A | 10/2017 |
| JP | 2019207779 A | 12/2019 |
| KR | 100601521 B1 | 7/2006 |
| KR | 20070103890 A | 10/2007 |
| KR | 20090124110 A | 12/2009 |
| KR | 20140053010 A | 5/2014 |
| KR | 20140078812 A | 6/2014 |
| KR | 20140106327 A | 9/2014 |
| KR | 20140141429 A | 12/2014 |
| KR | 20150061996 A | 6/2015 |
| KR | 20160014828 A | 2/2016 |
| KR | 20160051037 A | 5/2016 |
| KR | 20160051383 A | 5/2016 |
| KR | 20170118531 A | 10/2017 |
| WO | 2009001947 A1 | 12/2008 |
| WO | 2013146803 A1 | 10/2013 |

OTHER PUBLICATIONS

Extended European Search Report including Written Opinion for EP19822790.2 dated Oct. 5, 2020; 8 pages.

Search Report for Chinese Application No. 201980004358.2 dated Dec. 9, 2021. 3 pgs.

* cited by examiner

VENTING DEVICE AND METHOD FOR MANUFACTURING THE SAME

CROSS-REFERENCE TO RELATED APPLICATION

The present application is a national phase entry under 35 U.S.C. § 371 of International Patent Application No. PCT/KR2019/000977, filed on Jan. 23, 2019, published in Korean, which claims priority from Korean Patent Application No. 10-2018-0069451, filed on Jun. 18, 2018, the disclosures of which are hereby incorporated herein by reference in their entireties.

TECHNICAL FIELD

The present invention relates to a venting device and a method for manufacturing the same, and more particularly, to at least one venting device, which is inserted into a sealing part of a pouch of a secondary battery to discharge an internal gas when an internal pressure of the pouch increases so as to adjust the internal pressure, and a method for manufacturing the same.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material. Also, in the can type secondary battery, an electrode assembly is accommodated in a case made of a metal or plastic material.

In the secondary battery, a gas may be generated by internal short-circuit, overcharging, overdischarging, or the like due to an external impact. In addition, when the secondary battery is stored at a high temperature, an electrochemical reaction between an electrolyte and an electrode active material is quickly accelerated by the high temperature to generate a gas.

Here, the generated gas may allow the secondary battery to increase in internal pressure to cause problems such as weakening of bonding force between components, damage of a case of the secondary battery, an early operation of a protection circuit, deformation of an electrode, internal short-circuit, explosion, and the like. To prevent these phenomena, in the case of the can type secondary battery, a protection member such as a CID filter and a safety vent is provided. Thus, when the pressure within the case increases, electrical connection may be physically interrupted. However, in the case of the pouch type secondary battery according to the related art, the protection member is not sufficiently provided.

DISCLOSURE OF THE INVENTION

Technical Problem

An object to be solved by the present invention is to provide at least one venting device, which is inserted into a sealing part of a pouch of a secondary battery to discharge an internal gas when an internal pressure of the pouch increases so as to adjust the internal pressure, and a method for manufacturing the same.

The objects of the present invention are not limited to the aforementioned object, but other objects not described herein will be clearly understood by those skilled in the art from descriptions below.

Technical Solution

To solve the problem, a venting device inserted into a sealing part of a pouch of a secondary battery according to an embodiment of the present invention includes: a housing inserted between confronting surfaces of the sealing part so as to be sealed together with the sealing part, the housing being made from a metal plate; a gasket made of a polymer and disposed in the housing and through which a passage is defined providing gas communication between an inside and an outside of the pouch; and a plate spring made of a metal, the plate spring being disposed in the housing and assembled with the gasket, the plate spring being configured to open and close the passage in response to a change in an internal pressure of the pouch, wherein the housing includes a crimping part crimped together with the gasket on an upper end of the housing.

Also, the gasket may include: a lower gasket through which the passage passes; and an upper gasket having an outer diameter that is the same as an outer diameter of the lower gasket, the upper gasket extending upward from the lower gasket, the upper gasket having a thickness that is smaller than a thickness of the lower gasket, and the upper gasket being crimped together with the crimping part.

Also, the plate spring may include: a central portion formed at a center of the plate spring; and a peripheral portion extending outward from the central portion, wherein a gas exhaust hole may be punched in the peripheral portion.

Also, the crimping part may be crimped onto the peripheral portion of the plate spring.

Also, the venting device may further include a ball disposed between the gasket and the plate spring at an outlet-side of the passage, the ball being configured to open and close the passage, the ball having a lower position contacting the gasket and an upper position spaced apart from the gasket.

Also, in the gasket, an edge of an inner circumference of a surface of the outlet-side of the passage may be chamfered or filleted.

Also, the housing may include an upper housing and a lower housing, the upper housing and the lower housing having shapes or sizes different from each other.

Also, the lower housing may have a width less than a width of the upper housing, the width of the lower housing and the width of the upper housing being defined in a lateral direction perpendicular to a longitudinal flow direction of the passage defined through the gasket.

Also, the upper housing may have a circular cylinder shape, and the lower housing may have an oval cylinder shape.

Also, the gasket may be inserted into the upper housing.

To solve the problem, a method for manufacturing a venting device inserted into a sealing part of a pouch of a secondary battery according to an embodiment of the present invention includes: a step of forming a metal plate to manufacture a housing having an insertion space therein; a step of installing a plate spring onto a gasket; a step of inserting the gasket, onto which the plate spring is installed, into the insertion space of the housing; and a step of crimping a crimping part onto the plate spring and the gasket, the crimping part formed from an upper end of the housing. A passage may be defined through the gasket providing gas communication between an inside and an outside of the pouch, and the plate spring may be configured to open and close the passage in response to a change in an internal pressure of the pouch.

Also, during the step of forming the metal plate, the housing may be manufactured through a drawing process in which the metal plate is elongated by using at least one punch.

Also, the at least one punch may include a first punch and a second punch, and the drawing process may include: a first drawing process in which the metal plate is elongated by using the first punch; and a second drawing process in which the metal plate is elongated by using the second punch having a cross-sectional diameter less than that of the first punch.

Also, the first punch may have a circular transverse cross-section, and the second punch may have an oval transverse cross-section.

Also, the step of installing the plate spring, a ball may be installed between the gasket and the plate spring at an outlet-side of the passage. The ball may be configured to open and close the passage. The ball may have a lower position contacting the gasket and an upper position spaced apart from the gasket.

Particularities of other embodiments are included in the detailed description and drawings.

Advantageous Effects

The embodiments of the present invention may have at least the following effects.

The metal plate may be drawn to manufacture the housing of the venting device, and the crimping part formed on the upper end of the housing may be crimped to quickly and economically manufacture the venting device and improve the sealability.

In addition, the outer wall of the housing of the venting device may be manufactured with the thin thickness to more miniature the venting device.

The effects of the prevent invention are not limited by the aforementioned description, and thus, more varied effects are involved in this specification.

MODE FOR CARRYING OUT THE INVENTION

Figure 1:
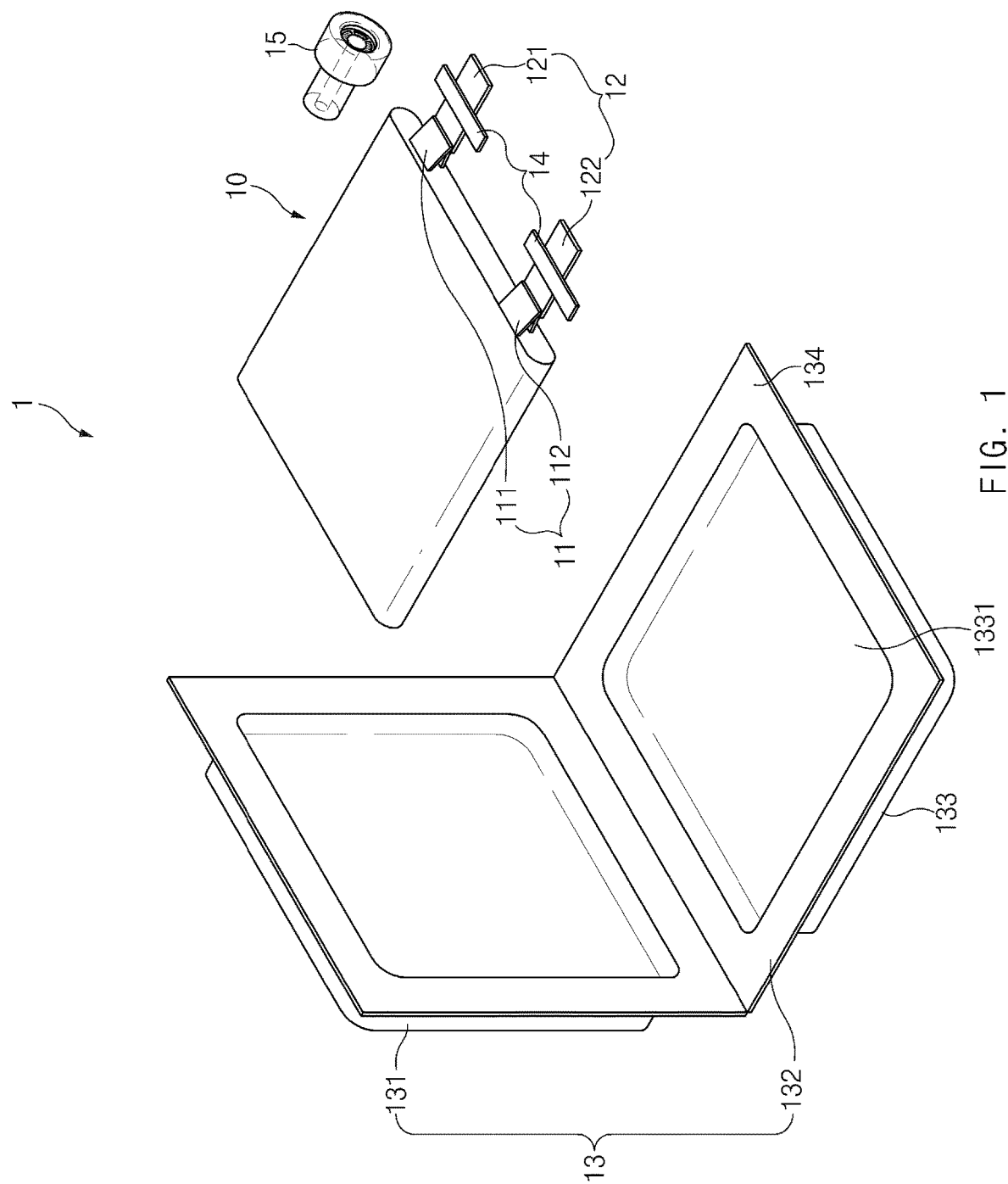
FIG. 1 is an assembled view of a secondary battery including a venting device according to an embodiment of the present invention.

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

Figure 2:
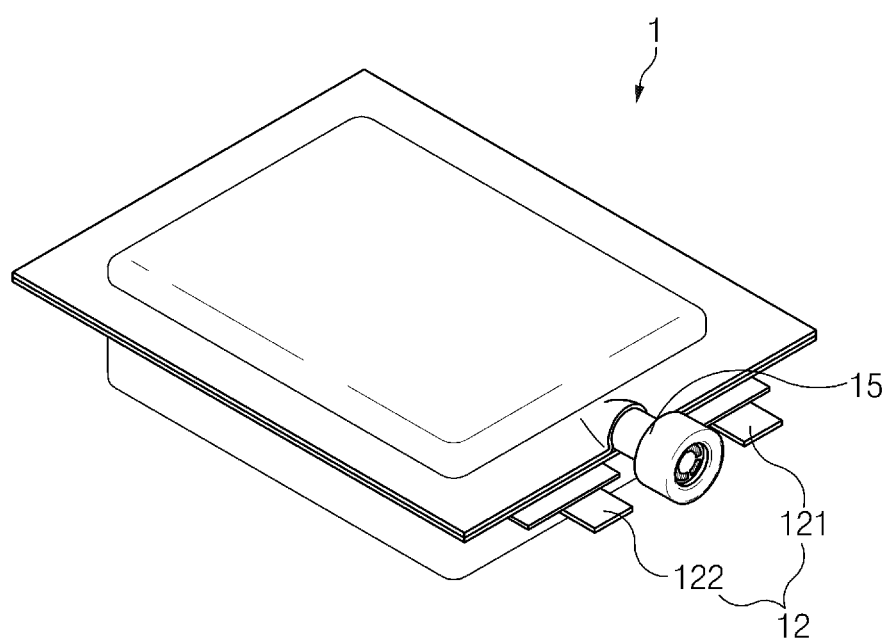
FIG. 2 is a perspective view of the secondary battery of FIG. 1, which is completely manufactured.

FIG. 1 is an assembled view of a secondary battery 1 including a venting device 15 according to an embodiment of the present invention, and FIG. 2 is a perspective view of the secondary battery 1 of FIG. 1, which is completely manufactured.

In order to manufacture the secondary battery 1 according to an embodiment of the present invention, first, electrode active material slurry is applied to a positive electrode collector and a negative electrode collector to manufacture a positive electrode and a negative electrode. Then, the electrodes are stacked on both sides of a separator to form an electrode assembly 10 having a predetermined shape. Then, the electrode assembly 10 is accommodated in a battery case 13, and also, an electrolyte is injected into the battery case 13 to perform sealing on the battery case 13.

As illustrated in FIG. 1, the electrode assembly 10 includes an electrode tab 11. The electrode tab 11 is connected to each of a positive electrode and a negative electrode of the electrode assembly 10 to protrude to the outside of the electrode assembly 10, thereby providing a path, through which electrons are moved, between the inside and outside of the electrode assembly 10. The electrode collector of the electrode assembly 10 is constituted by a portion coated with the slurry and a distal end, on which the slurry is not applied, i.e., a non-coating portion. Also, the electrode tab 11 may be formed by cutting the non-coating portion or by connecting a separate conductive member to the non-coating portion through ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 through spot welding. Also, a portion of the electrode lead 12 is surrounded by an insulation part 14. The insulation part 14 may be disposed to be limited within a sealing part 134, at which an upper pouch 131 and a lower pouch 132 of the battery case 13 are thermally fused, so that the electrode lead 12 is bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 may extend in the same direction or extend in directions different from each other according to the formation positions of the positive electrode tab 111 and the negative electrode tab 112. The positive electrode lead 121 and the negative electrode lead 122 may be made of materials different from each other. That is, the positive electrode lead 121 may be made of the same material as the positive current collector, i.e., an aluminum (Al) material, and the negative electrode lead 122 may be made of the same material as the negative current collector, i.e., a copper (Cu) material or a copper material coated with nickel (Ni). Also, a portion of the electrode lead 12, which protrudes to the outside of the battery case 13, may be provided as a terminal part and electrically connected to an external terminal.

In the pouch type secondary battery 1 according to an embodiment of the present invention, the battery case 13 may be a pouch made of a flexible material. Hereinafter, the case in which the battery case 13 is the pouch will be described. Also, the battery case 13 accommodates the electrode assembly 10 so that a portion of the electrode lead 12, i.e., the terminal part is exposed and then is sealed. As illustrated in FIG. 1, the battery case 13 includes the upper pouch 131 and the lower pouch 132. A cup part 133 having an accommodation space 1331 accommodating the electrode assembly 10 is formed in the lower pouch 132, and the upper pouch 131 covers an upper portion of the accommodation space 1331 to prevent the electrode assembly 10 from being separated to the outside of the battery case 13. Here, as illustrated in FIG. 1, the cup part 133 having the accommodation space 1331 may be formed in the upper pouch 131 to accommodate the electrode assembly 10 in the upper portion. As illustrated in FIG. 1, one side of the upper pouch 131 and one side of the lower pouch 132 may be connected to each other. However, the present invention is not limited thereto. For example, the upper pouch 131 and the lower pouch may be separately manufactured to be separated from each other.

After the upper pouch 131 and the lower pouch 132 of the battery case 13 contact each other, the sealing part 134 formed on an edge may be sealed. Here, as illustrated in FIG. 1, according to an embodiment of the present invention, the venting device 15 is inserted between both surfaces of the sealing part 134 so as to be sealed together with the sealing part 134 and thus be fixed within the sealing part 134. Also, the venting device 15 includes a passage 154 through which the inside and the outside of the battery case 13 communicate with each other. When an internal pressure of the battery case 13 increases, an internal gas is discharged to the outside to adjust the pressure. The venting device 15 will be described below in detail.

When the electrode lead 12 is connected to the electrode tab 11 of the electrode assembly 10, and the insulation part 14 is provided on a portion of the electrode lead 12, the electrode assembly 10 may be accommodated in the accommodation space 1331 provided in the lower pouch 132, and the upper pouch 131 may cover the upper side of the accommodation space 1331. Also, when the electrolyte is injected, and the sealing part 134 provided on the edge of each of the upper pouch 131 and the lower pouch 132 is sealed, the secondary battery 1 is manufactured as illustrated in FIG. 2.

Figure 3:
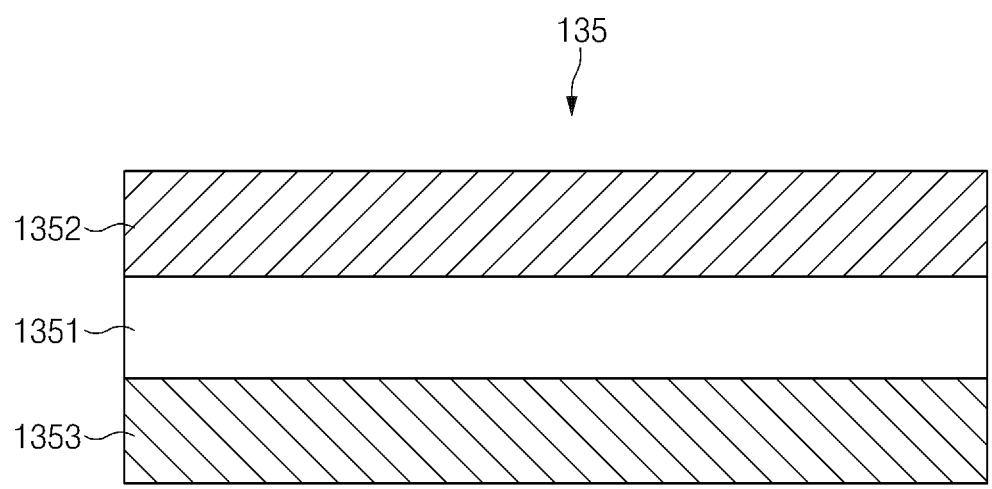
FIG. 3 is a partial cross-sectional view of a battery case according to an embodiment of the present invention.

FIG. 3 is a partial cross-sectional view of the battery case 13 according to an embodiment of the present invention.

The battery case 13 is manufactured by performing drawing on the pouch film 135. That is, the pouch film 135 is elongated to form the cup part 133, thereby manufacturing the battery case 13. As illustrated in FIG. 3, the pouch film 135 includes a gas barrier layer 1351, a surface protection layer 1352, and a sealant layer 1353.

The gas barrier layer 1351 may secure mechanical strength of the battery case 13, block introduction and discharge of a gas or moisture outside the secondary battery 1, and prevent the electrolyte from leaking. In general, the gas barrier layer 1351 includes a metal. Particularly, aluminum (Al) foil is mainly used for the gas barrier layer 1351. Aluminum may secure the mechanical strength of a predetermined level or more, but be light in weight. Thus, aluminum may secure complement and heat dissipation for electrochemical properties of the electrode assembly 10 and the electrolyte. However, the present invention is not limited thereto. For example, the gas barrier layer 1351 may be made of various materials. For example, the gas barrier layer 1351 may be made of one material or a mixture of two or more materials selected from the group consisting of Fe, C, Cr, Mn, Ni and Al. Here, the gas barrier layer 1351 is made of a material containing iron, the mechanical strength may be improved. When the gas barrier layer 1351 is made of a material containing aluminum, flexibility may be improved. Thus, the material forming the gas barrier layer 1351 may be used in consideration of the characteristics of the gas barrier layer 1351.

The surface protection layer 1352 is made of a polymer and disposed at the outermost layer to protect the secondary battery 1 against external friction and collision and also electrically insulates the electrode assembly 10 from the outside. Here, the outermost layer represents a direction opposite to a direction in which the electrode assembly 10 is disposed with respect to the gas barrier layer 1351, i.e., in an outward direction. The surface protection layer 1352 may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polymer such as a nylon resin or polyethylene terephthalate (PET) having mainly abrasion resistance and heat resistance is used. Also, the surface protection layer 1352 may have a single layer structure made of one material or a composite layer structure in which two or more materials are respectively formed as layers.

The sealant layer 1353 is made of a polymer and disposed at the innermost layer to directly contact the electrode assembly 10. The pouch type battery case 13 may be manufactured while a portion thereof is stretched to form the cup part 133 having the accommodation space 1331 having a bag shape when the pouch film 135 having the lamination structure as described above is drawn by using a punch or the like. Also, when the electrode assembly 10 is accommodated in the accommodation space 1331, the electrolyte is injected. Thereafter, when the upper pouch 131 and the lower pouch 132 may contact each other, and thermal compression is applied to the sealing part 134, the sealant layers 1353 may be bonded to each other to seal the battery case 13. Here, since the sealant layer 1353 directly contacts the electrode assembly 10, the sealant layer 1353 may have to have insulating properties. Also, since the sealant layer 1353 contacts the electrolyte, the sealant layer 1353 may have to have corrosion resistance. Also, since the inside of the battery case 13 is completely sealed to prevent materials from moving between the inside and outside of the battery case 13, high sealability has to be realized. That is, the sealing part 134 in which the sealant layers 1353 are bonded to each other should have superior bonding strength. In general, the sealant layer 1353 may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polyolefin-based resin such as polypropylene (PP) or polyethylene (PE) may be used for the sealant layer 1353. Polypropylene (PP) is excellent in mechanical properties such as tensile strength, rigidity, surface hardness, abrasion resistance, and heat resistance and chemical properties such as corrosion resistance and thus is mainly used for manufacturing the sealant layer 1353. Furthermore, the sealant layer 1353 may be made of a cated polypropylene or a polypropylene-butylene-ethylene terpolymer. Also, the sealant layer 1353 may have a single layer structure made of one material or a composite layer structure in which two or more materials are respectively formed as layers.

Figure 4:
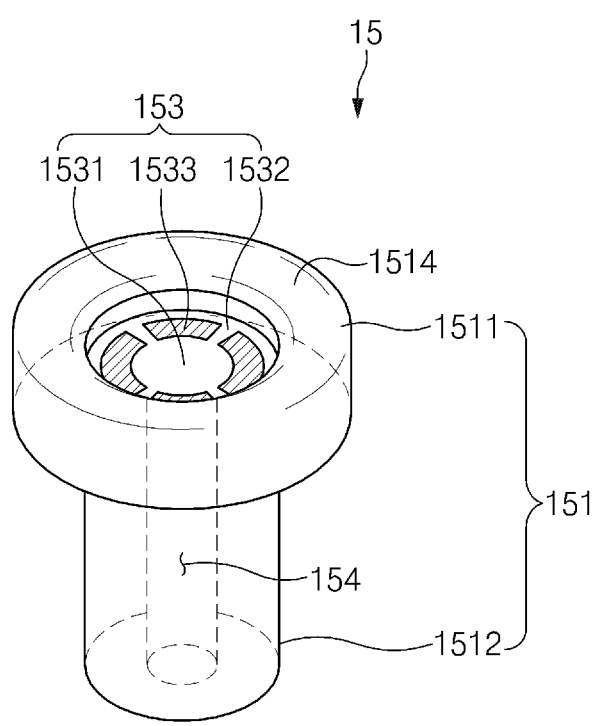
FIG. 4 is a perspective view of a venting device according to an embodiment of the present invention.

FIG. 4 is a perspective view of the venting device 15 according to an embodiment of the present invention.

As described above, the secondary battery 1 according to an embodiment of the present invention further includes at least one venting device 15. At least one venting device 15 is inserted into the sealing part 134 of the pouch of the secondary battery 1 to discharge the internal gas when the internal pressure of the pouch increase, thereby adjusting the pressure. For this, the venting device 15 includes: a housing 151 inserted between both the surfaces of the sealing part 134 so as to be sealed together with the sealing part 134 and manufactured by using a metal plate 2; a gasket 152 which is made of a polymer and formed in the housing 151 and through which a passage 154 allowing the inside and the outside of the pouch to communicate with each other passes; and a plate spring 153 opening and closing the passage 154 according an internal pressure of the pouch and made of a metal. Also, the housing 151 includes a crimping part 1514 formed on an upper end thereof and crimped together with the gasket 152.

Also, the venting device 15 further include a ball 155 disposed between the gasket 152 and the plate spring 153 to open and close the passage 154 by contacting or being spaced apart from the gasket 152 at an outlet-side of the passage 154.

The housing 151 may be inserted between both the surfaces of the sealing part 134 so as to be sealed together with the sealing part 134 and be manufactured by using the metal plate 2. When the housing 151 is inserted between both the surfaces of the sealing part 134, a sealant layer 1353 that is the innermost layer of the sealing part 134 contacts the housing 151. Also, when heat and a pressure are applied, while the sealant layer 1353 of the sealing part 134 is sealed, the housing 151 is fused to be sealed together. As illustrated in FIG. 4, the housing 151 may include an upper housing 1511 and a lower housing 1512, and a stepped portion may be formed between the upper housing 1511 and the lower housing 1512. The stepped portion may be formed because the upper housing 1511 and the lower housing 1512 have shapes and sizes different from each other. For example, the upper housing 1511 may have a transverse section having a circular cylinder shape, and the lower housing 1512 may have a transverse section having an oval cylinder shape. Alternatively, the lower housing 1512 may have a width less than that of the upper housing 1511. Thus, the lower housing 1512 may be inserted between both the surfaces of the sealing part 134 so as to be sealed together with the sealing part 134. Thus, the lower housing 1512 may be fused to the inner surface of the sealing part 134, and the upper housing 1511 may protrude to the outside of the pouch.

Here, if the lower housing 1512 has an excessively large width, the sealing part 134 has to be deformed in size. Thus, the sealing of the sealing part 134 may be damaged. Thus, the lower housing 1512 may have a width less than a thickness of the sealing part 134. Particularly, it is preferable that a long axis of the transverse section has a width that is 6 mm or more less. Also, as described above, the lower housing 1512 may have an oval cylinder shape having an oval transverse cross-section. Thus, the lower housing 1512 may be easily sealed to the sealing part 134, and the sealing may be maintained for a long time without being broken.

Also, if the upper housing 1511 has an excessively large size, the upper housing 1511 protruding to the outside of the pouch may interfere with other secondary batteries 1 that are disposed in the vicinity of the upper housing 1511. Thus, it may be difficult to assemble a package or module of the secondary battery 1. Thus, the upper housing 1511 may have a width less than a thickness of the sealing part 134. Particularly, it is preferable that the transverse section has a diameter 8 mm or more less. However, the present invention is not limited thereto. For example, the upper housing 1511 and the lower housing 1512 may have various shapes, for example, one cylinder shape without being distinguished from each other.

The gasket 152 (see FIG. 10) is made of a polymer and formed in the housing 151. Also, the passage 154 through which the inside and the outside of the pouch communicate with each other may be formed to pass through a center of the gasket 152. The gasket 152 will be described below in detail.

The plate spring 153 may be made of a metal to open and close the passage 154 formed in the gasket 152 according to an internal pressure of the pouch. Particularly, when the internal pressure of the pouch is less than a specific pressure, the plate spring 153 may contact the gasket 152 to close the outlet 1541 (see FIG. 10) of the passage 154. Also, when the internal pressure of the pouch gradually increase to exceed the specific pressure, the plate spring 153 may be spaced apart from the gasket 152 to open the outlet 1541 of the passage 154. As illustrated in FIG. 4, the plate spring 153 includes a central portion 1531, a peripheral portion 1532, and a gas exhaust hole 1533. The plate spring 153 will be described below in detail.

The crimping part 1514 is formed on an upper end of the housing 151 and then crimped together with the gasket 152 to prevent the plate spring 153 and the ball 155 (see FIG. 11) from being separated. The crimping part 1514 will be described below in detail.

Figure 5:
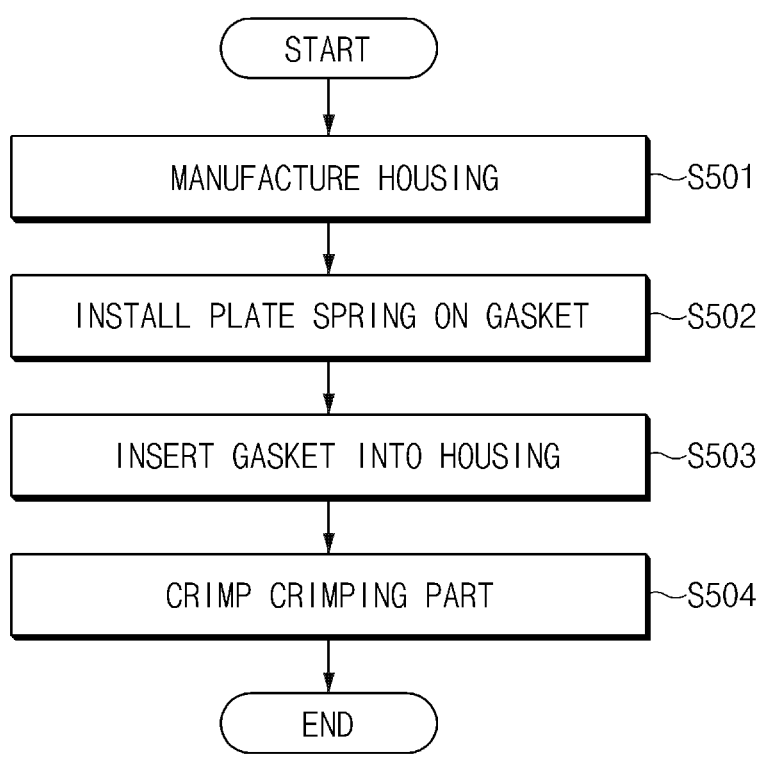
FIG. 5 is a flowchart illustrating a method for manufacturing the venting device according to an embodiment of the present invention.

FIG. 5 is a flowchart illustrating a method for manufacturing the venting device 15 according to an embodiment of the present invention.

According to an embodiment of the present invention, the metal plate 2 may be drawn to manufacture the housing 151 of the venting device 15, and then, the crimping part formed on the upper end of the housing 151 may be crimped to quickly and economically manufacture the venting device 15 and improve the sealability. Also, since an outer wall of the housing 151 of the venting device 15 is manufactured with a thin thickness, the venting device 15 may be more miniaturized. For this, a method for manufacturing the venting device 15, which is inserted into the sealing part 134 of the pouch of the secondary battery 1, according to an embodiment of the present invention includes: a step (S501) of forming a metal plate 2 to manufacture a housing 151 having an insertion space 1513 therein; a step (S502) of installing a plate spring 153, which opens and closes a passage 154 according to an internal pressure of the pouch, on a gasket 152 through which the passage 154 allowing the inside and the outside of the pouch to communicate with each other passes; a step (S503) of inserting the gasket 152, on which the plate spring 153 is installed, into the insertion space 1513 of the housing 151; and a step (S504) of crimping a crimping part 1514 formed on an upper end of the housing 151.

In the step of manufacturing the housing 151, the housing 151 is manufactured by performing a drawing process in which the metal plate 2 is elongated by using a punch. The drawing process includes: a first drawing process in which the metal plate 2 is elongated by using a first punch; and a second drawing process in which the metal plate 2 is elongated by using a second punch having a cross-sectional diameter less than that of the first punch.

Hereinafter, each of the steps illustrated in the flowchart of FIG. 5 will be described with reference to FIGS. 6 to 14.

Figure 6:
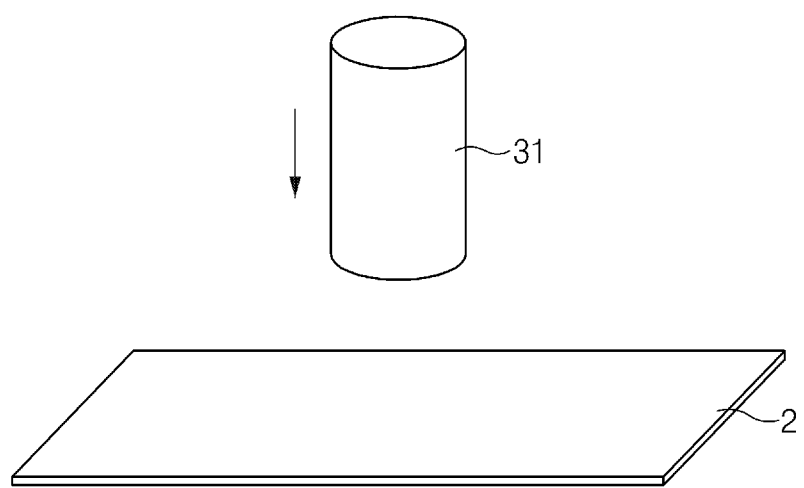
FIG. 6 is a schematic view of a metal plate on which first drawing is performed according to an embodiment of the present invention.

FIG. 6 is a schematic view of the metal plate 2 on which the first drawing is performed according to an embodiment of the present invention.

As illustrated in FIG. 6, the metal plate 2 has a wide and thin plate shape and is made of a metal. Particularly, the metal plate may include aluminum (Al) or stainless steel (STS). Also, according to an embodiment of the present invention, the metal plate 2 is formed to manufacture the housing 151. The drawing process of elongating the metal plate 2 by using the punch may be performed to manufacture the housing 151. Furthermore, according to an embodiment of the present invention, the drawing may be performed several times, particularly, two times on the metal plate 2. Particularly, the metal plate 2 is seated on a die, and a stripper fixes the metal plate 2. Then, the metal plate 2 is elongated by using the first punch to form the first drawing.

Figure 7:
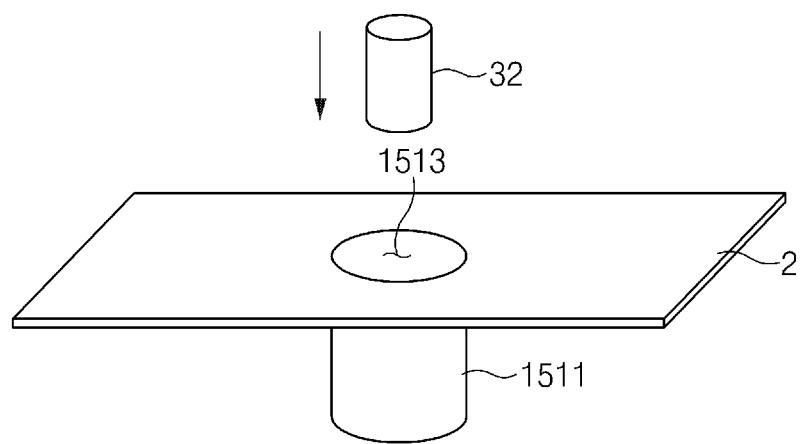
FIG. 7 is a schematic view of a metal plate on which second drawing is performed according to an embodiment of the present invention.

FIG. 7 is a schematic view of the metal plate 2 on which the second drawing is performed according to an embodiment of the present invention.

As described above, when the first drawing is performed on the metal plate 2, an upper housing 1511 is formed as illustrated in FIG. 7. The upper housing 1511 has a cup shape of which a lower portion is convex outward and includes insertion space 1513, into which the gasket 152 is inserted, therein.

As described above, the drawing may be performed several times, particularly, two times on the metal plate 2. Thus, when the first drawing is completed, a bottom surface of the upper housing 1511 is seated again on the die, and the stripper fixes the upper housing 1511 of the metal plate 2. Then, the metal plate 2 is elongated by using the second punch to perform the second drawing.

Figure 8:
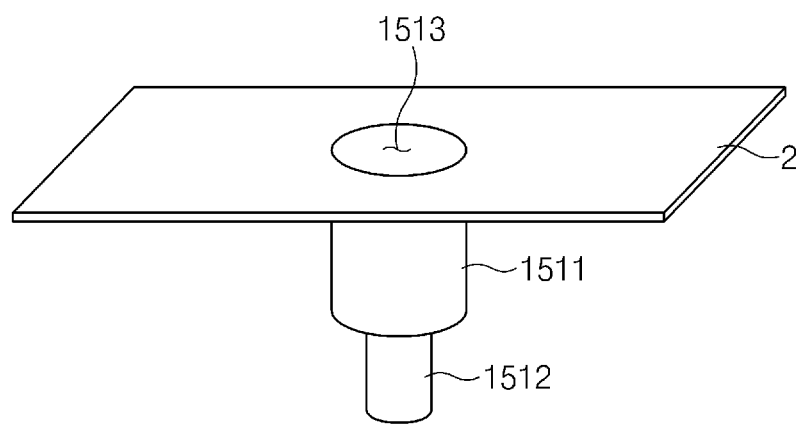
FIG. 8 is a schematic view of a metal plate on which the drawing is completed according to an embodiment of the present invention.

FIG. 8 is a schematic view of the metal plate 2 on which the drawing is completed according to an embodiment of the present invention.

As described above, when the second drawing is performed, a lower housing 1512 is formed as illustrated in FIG. 8. The lower housing 1512 is formed from the bottom surface of the upper housing 1511 and has a cup shape of which a lower portion is convex outward, like the upper housing 1511. Also, a passage 154 is formed in the lower housing 1512.

The second punch used for the second drawing may have a cross-sectional diameter less than that of the first punch used for the first drawing. Thus, as described above, a stepped portion may be formed between the upper housing 1511 and the lower housing 1512. Particularly, the lower housing 1512 may have a width less than that of the upper housing 1511. Also, the first punch may have a circular transverse cross-section, and the second punch may have an oval transverse cross-section. As a result, as described above, the upper housing 1511 may have a circular cylinder shape having a circular transverse cross-section, and the lower housing 1512 may have an oval cylinder shape having an oval transverse cross-section.

According to an embodiment of the present invention, an outer portion of the lower housing 1512 is sealed to the sealing part 134, and an inner portion of the lower housing 1512 allows the passage 154 formed in the gasket 152 to extend. That is, the inner portion of the lower housing 1512 constitutes a portion of the passage 154. Also, when a punching operation is performed in the bottom surface of the formed housing 151, an inlet of the passage 154 may be formed, and thus, a gas within the pouch may be introduced into the passage 154 through the inlet.

However, the present invention is not limited thereto. For example, the housing itself without including the upper housing 1511 and the lower housing 1512 may have the cylinder shape, which does not have the stepped portion. For this, the drawing may be performed only one time or several times on the metal plate 2 by using only one punch. As a result, since the drawing is performed by using only the one punch, it may be unnecessary to adjust the die and the stripper again, and thus, a time taken to manufacture the venting device 15 may be reduced. Here, if the pouch has a circular transverse cross-section, the housing 151 may also have a circular cylinder shape. If the punch has an oval transverse cross-section, the housing 151 may also have an oval cylinder shape. However, as described above, in order that the housing 151 is easily sealed to the sealing part 134 to maintain the sealing for a long time without being broken, it is preferable that the punch having the oval transverse cross-section is used so that the housing 151 has the oval cylinder shape having the oval transverse cross-section.

Figure 9:
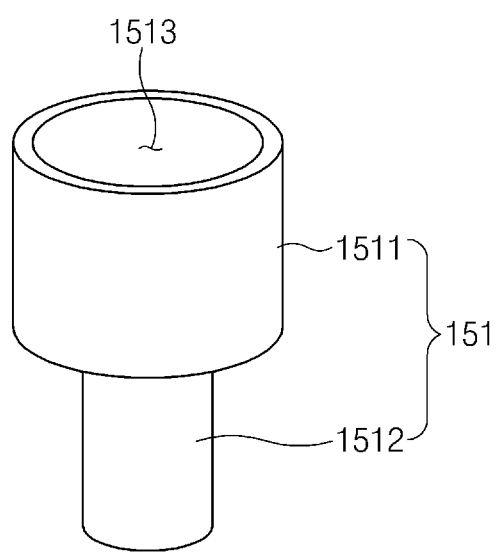
FIG. 9 is a perspective view of a housing manufactured by extracting only a drawn portion of the metal plate according to an embodiment of the present invention.

FIG. 9 is a perspective view of the housing 151 manufactured by extracting only a drawn portion of the metal plate 2 according to an embodiment of the present invention.

When the drawing is completely performed on the metal plate 2, the metal plate 2 includes a drawn portion and a remaining portion on which the drawing is not performed. Here, the remaining portion on the drawing is not performed is removed, and only the drawn portion is extracted to manufacture the housing 151 as illustrated in FIG. 9 (S501).

The housing 151 includes a crimping part 1514 on an upper end thereof. The crimping part 1514 is formed on the housing 151, particularly, the upper end of the housing 151 and then crimped together with the gasket 152 to prevent the plate spring 153 and the ball 155 from being separated. Here, the crimping means that the crimping part 1514 is bent so that the crimping part 1514 and the gasket 152 seal an outer surface of the plate spring 153.

If a separate plate is inserted to an upper side of the plate spring 153, an outer circumferential surface of the plate may press an inner wall of the housing 151 to generate frictional force, thereby preventing the plate spring 153 and the ball 155 from being separated. However, since the plate spring 153 is made of a metal, and also, the plate is made of a metal, a gap may be generated between the plate spring 153 and the plate to cause a problem in which moisture is permeated. Thus, according to an embodiment of the present invention, the crimping part 1514 is crimped together with the gasket 152 to prevent the moisture from being permeated into the venting device 15.

According to an embodiment of the present invention, the metal plate 2 is drawn to manufacture the housing 151 of the venting device 15 without performing a cutting process using a lathe or a milling. Also, the crimping part 1514 formed on the upper end of the housing 151 is crimped without inserting a separate plate. Thus, the venting device 15 may be quickly and economically manufactured and improved in sealability. Also, since an outer wall of the housing 151 of the venting device 15 is manufactured with a thin thickness, the venting device 15 may be more miniaturized.

Figure 10:
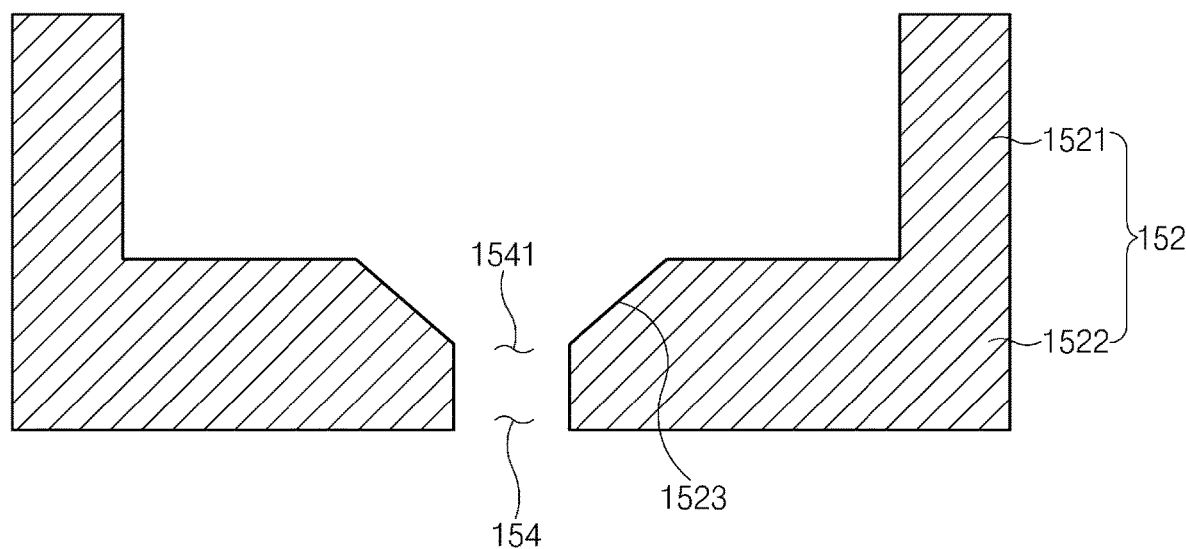
FIG. 10 is a lateral cross-sectional view of a gasket according to an embodiment of the present invention.

FIG. 10 is a lateral cross-sectional view of the gasket 152 according to an embodiment of the present invention.

The gasket 152 is made of a polymer and formed in the housing 151. Particularly, it is preferable that the gasket 152 is made of a material having insulation, impact resistance, elasticity, and durability, for example, a polyolefin-based polymer such as polypropylene (PP) or polyethylene (PE). As illustrated in FIG. 10, the gasket 152 includes a lower gasket 1522 through which the passage 154 passes and an upper gasket 1521 having the same outer diameter as the lower gasket 1522, extending upward from the lower gasket 1522, having a thickness that is relatively thinner than that of the lower gasket 1522, and crimped together with the crimping part 1514 when the crimping part 1514 is crimped. The gasket 152 may be assembled after the lower gasket 1522 and the upper gasket 1521 are separately manufactured. However, it is preferable that the lower gasket 1522 and the upper gasket 1521 are integrally manufactured from the beginning.

If the housing 151 includes the upper housing 1511 and the lower housing 1512 as described above, it is preferable that the gasket 152 is inserted into the upper housing 1511. Here, the lower gasket 1522 has a disc shape. Also, the lower gasket 1522 has a shape and size, which correspond to the insertion space 1513 formed in the upper housing 1511 so that the lower gasket 1522 is easily inserted into the upper housing 1511. That is, if the upper housing 1511 has the circular cylinder shape, the lower gasket 1522 may also have a circular disc shape. If the upper housing 1511 has the oval cylinder shape, the lower gasket 1522 may also have an oval disc shape. Thus, when the lower gasket 1522 is inserted into the upper housing 1511, an outer circumferential surface of the lower gasket 1522 is closely attached to an inner circumferential surface of the upper housing 1511.

A passage 154 allowing the inside and the outside of the pouch to communicate with each other is formed to pass through a center of the lower gasket 1522. Also, as described above, the passage 154 formed in the lower gasket 1522 extends to the inside of the lower housing 1512.

The upper gasket 1521 has the same outer diameter as the lower gasket 1522, extends upward from the lower gasket 1522, and has a relatively thin thickness when compared to the lower gasket 1522. Since the upper gasket 1521 has the same outer diameter as the lower gasket 1522, an outer circumferential surface of the upper gasket 1521 and an outer circumferential surface of the lower gasket 1522 may extend without generating a stepped portion therebetween. Thus, when the gasket 152 is inserted into the upper housing 1511, the outer circumferential surface of the upper gasket 1521 as well as the lower gasket 1522 is closely attached to the inner circumferential surface of the upper housing 1511. Also, the upper gasket 1522 has a relatively thin thickness when compared to the lower gasket 1522 and extends upward. Thus, when the crimping part 1514 formed on the upper end of the upper housing 1511 is crimped, the upper gasket 1521 is crimped together with the camping part 1514.

Figure 11:
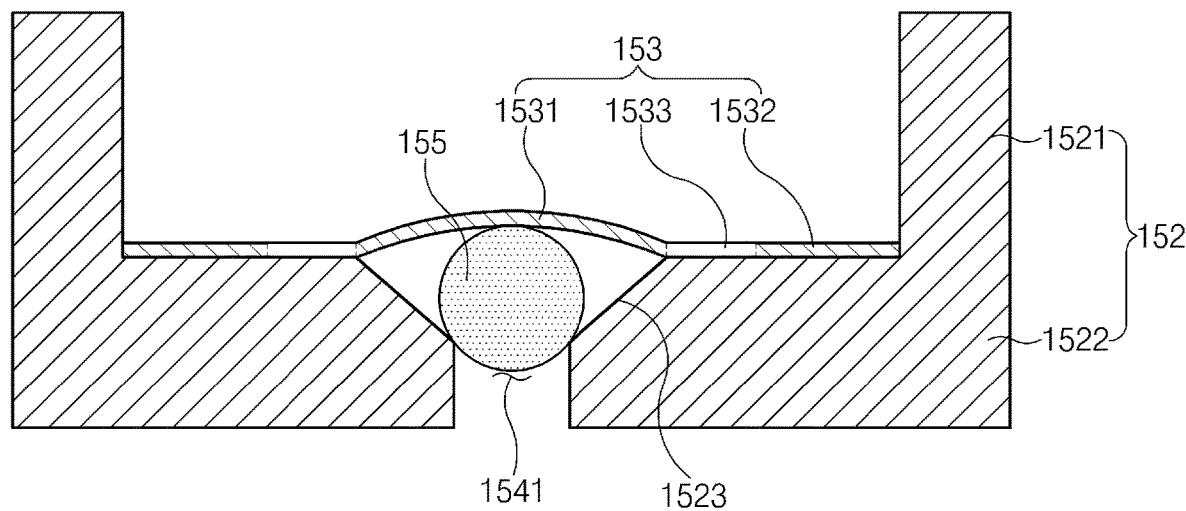
FIG. 11 is a lateral cross-sectional view illustrating a state in which a ball and a plate spring are installed on the gasket according to an embodiment of the present invention.

FIG. 11 is a lateral cross-sectional view illustrating a state in which the ball 152 and the plate spring 153 are installed on the gasket according to an embodiment of the present invention.

The plate spring 153 may be made of a metal to open and close the passage 154 formed in the gasket 152 according to the internal pressure of the pouch. Thus, as illustrated in FIG. 11, the plate spring 153 is installed on the prepared gasket 152 (S502). Particularly, in order that the plate spring 153 easily opens and closes the passage 154, it is preferable that the plate spring 153 is installed to contact a top surface of the lower gasket 1522 in which the outlet of the passage 154 is formed.

When the internal pressure of the pouch is less than a specific pressure, the plate spring 153 may contact the gasket 152 to close the outlet 1541 of the passage 154. Also, when the internal pressure of the pouch gradually increase to exceed the specific pressure, the plate spring 153 may be spaced apart from the gasket 152 to open the outlet 1541 of the passage 154.

According to the related art, the passage 154 is closed by using a coil spring. However, the venting device 15 has to be miniaturized so as to be inserted into the sealing part 134 of the secondary battery 1. However, if the coil spring is used like the related art, the venting device 15 may be complicated in structure and limited in miniaturization. Thus, according to an embodiment of the present invention, the plate spring 153 may be used to simplify the structure of the venting device 15 and miniaturize the venting device 15 so as to be inserted into the sealing part 134 of the secondary battery 1.

In order to discharge a gas to the outside when the plate spring 153 opens the passage 154, it is preferable that a gas exhaust hole 1533 is punched in the plate spring 153. Here, the plate spring 153 includes a central portion 1531 formed in a center thereof and a peripheral portion 1532 extending outward from the central portion 1531. Also, since the central portion 1531 closes the passage 154 formed in the gasket 152, the gas exhaust hole 1533 does not have to be punched in the central portion 1531. Thus, it is preferable that the gas exhaust hole 1533 is punched in the peripheral portion 1532 of the plate spring 153. An opening pressure of the venting device 15 may be changed according to the formed shape and area of the gas exhaust hole 1533. Thus, the gas exhaust hole 1533 may be adjusted in shape and area to adjust the opening pressure of the venting device 15. Here, the opening pressure means a specific pressure within the pouch when the venting device 15 is opened.

According to an embodiment of the present invention, when the plate spring 153 is installed on the gasket 152, the ball 155 may also be installed as illustrated in FIG. 11. The ball 155 has a spherical shape and is disposed between the gasket 152 and the plate spring 153, particularly, disposed at the outlet-side of the passage 154, which is formed in the gasket 152. Also, the ball 155 contacts or is spaced apart from the gasket 152 at the outlet-side of the passage 154 to open and close the passage 154. Particularly, the ball 155 receives elastic force from the central portion 1531 of the plate spring 153 toward the gasket 152 so as to be closely attached to the gasket 152, thereby closing the passage 154. Here, since the gasket 152 is made of the polymer, the ball 155 may be closely attached to the gasket 152 to prevent the gap from occurring, thereby preventing the sealability from being deteriorated. The ball 155 may be made of the polymer to more improve adhesion with respect to the gasket 152. However, the ball 155 may be made of a metal to improve durability.

In the gasket 152, an edge of an inner circumference of a surface of the outlet-side of the passage 154 may be chamfered or filleted. Thus, as illustrated in FIG. 11, the ball 155 may be easily closely attached to the chamfered or filleted surface 1523 of the gasket 152.

When a gas is generated in the pouch to gradually increase in internal pressure of the pouch and thus exceed a specific pressure, the gas pushes the ball 155 outward. Thus, since the ball 155 is pushed, the plate spring 153 is pushed outward. Also, the plate spring 153 may be spaced apart from the gasket 152 so that the ball 155 is separated from the gasket 152 to open the outlet 1541 of the passage. Thus, the gas within the pouch may be discharged to the outside through the passage 154 and the gas exhaust hole 1533.

The gas within the pouch is sufficiently discharged to the outside, and thus, the internal pressure of the pouch decreases again. As a result, while the pressure of the gas, which pushes the plate spring 153, decreases, the plate spring 153 returns to its original position by the elasticity thereof to push the ball 155 again inward. Also, the plate spring 153 contacts the gasket 152 again at the outlet-side of the passage 154, and thus, the ball 155 is closely attached to the gasket 152 to close the outlet 1541 of the passage 154.

Figure 12:
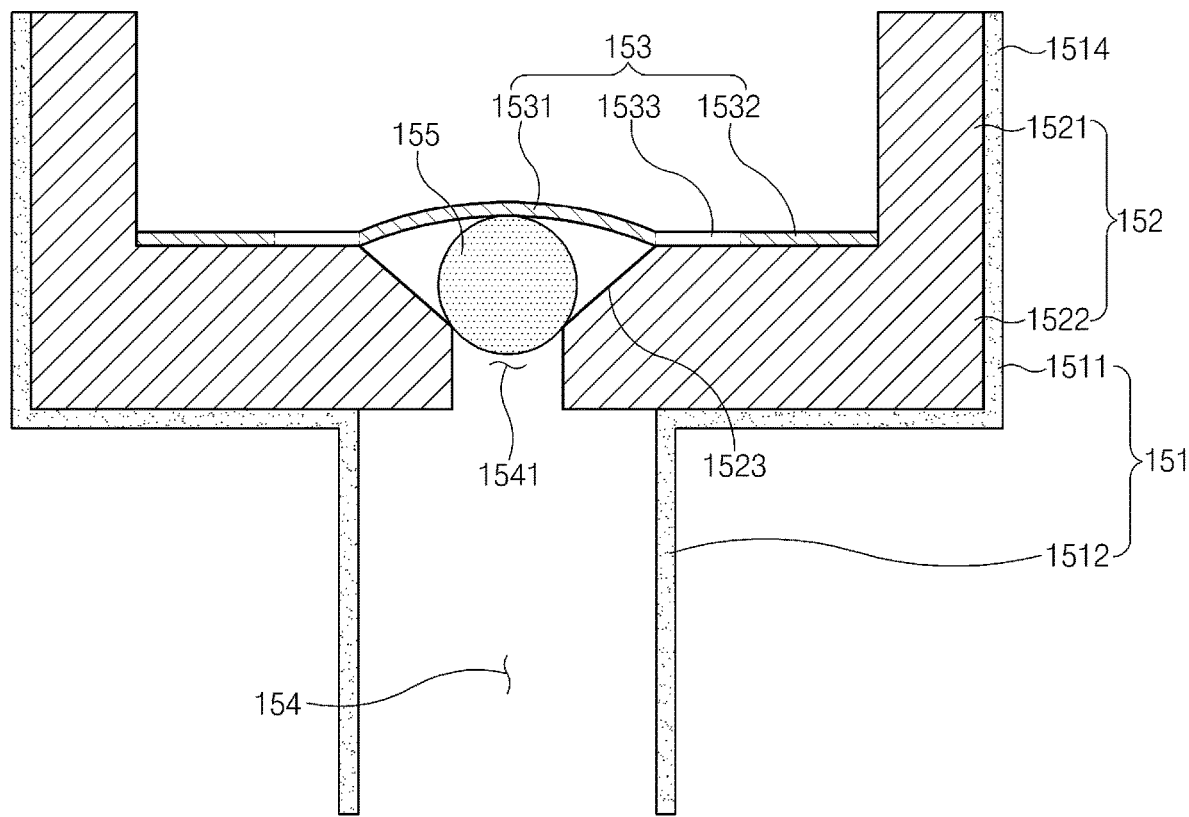
FIG. 12 is a lateral cross-sectional view illustrating a state in which the gasket is inserted into the housing according to an embodiment of the present invention.

FIG. 12 is a lateral cross-sectional view illustrating a state in which the gasket 152 is inserted into the housing 151 according to an embodiment of the present invention.

When the plate spring 153 is installed on the gasket 152, as illustrated in FIG. 12, the gasket 152 is inserted into the insertion space 1513 of the housing 151 (S503). Particularly, if the housing 151 includes the upper housing 1511 and the lower housing 1512, it is preferable that the gasket 152 is inserted into the upper housing 1511.

As described above, the lower gasket 1522 has a disc shape. Also, the upper gasket 1521 has the same outer diameter as the lower gasket 1522. Thus, when the gasket 152 is inserted into the upper housing 1511, the outer circumferential surface of the upper gasket 1521 as well as the lower gasket 1522 is closely attached to the inner circumferential surface of the upper housing 1511.

Figure 13:
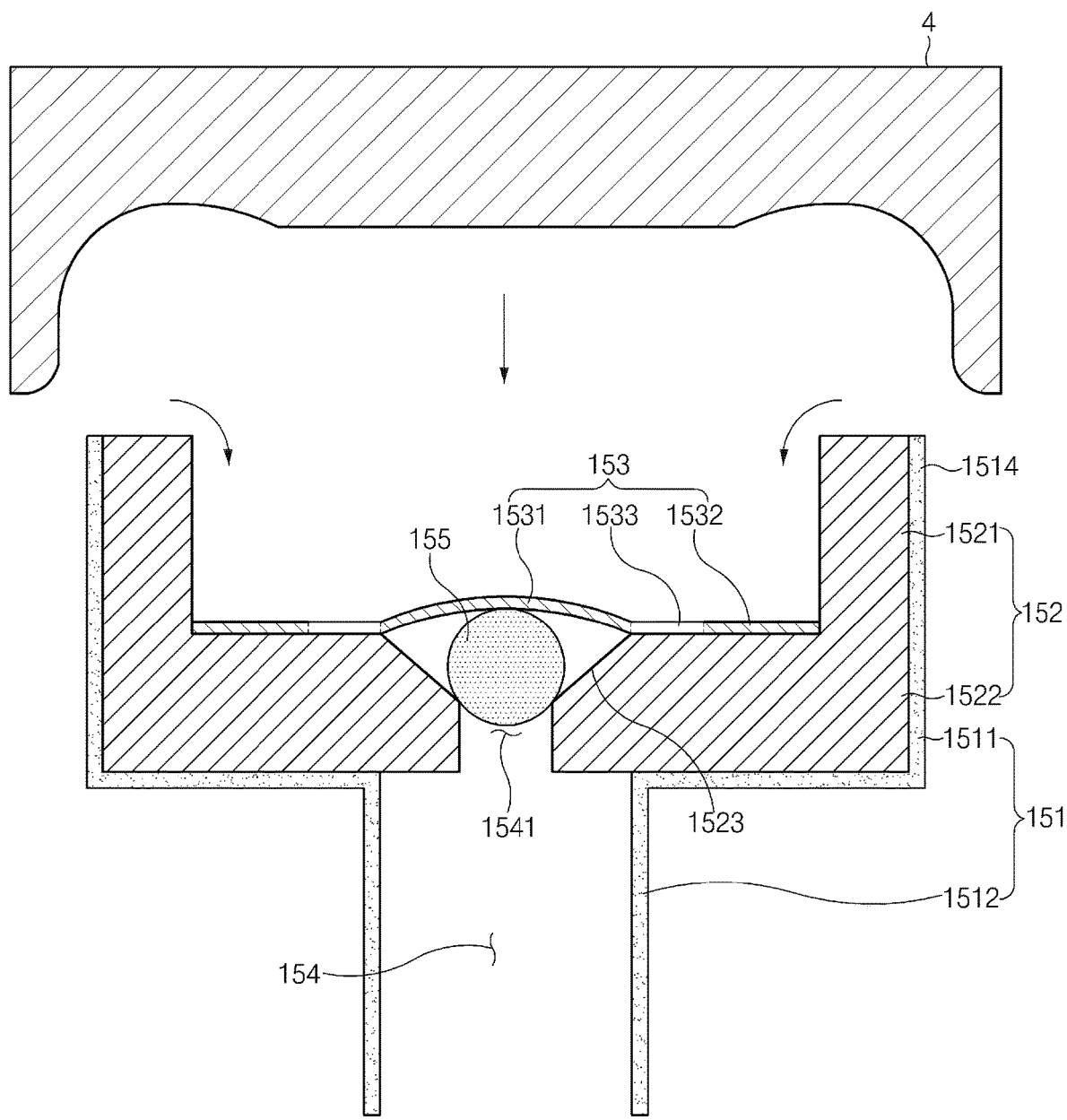
FIG. 13 is a lateral cross-sectional view illustrating a state in which crimping is performed on a crimping part formed on an upper end of the housing according to an embodiment of the present invention.
Figure 14:
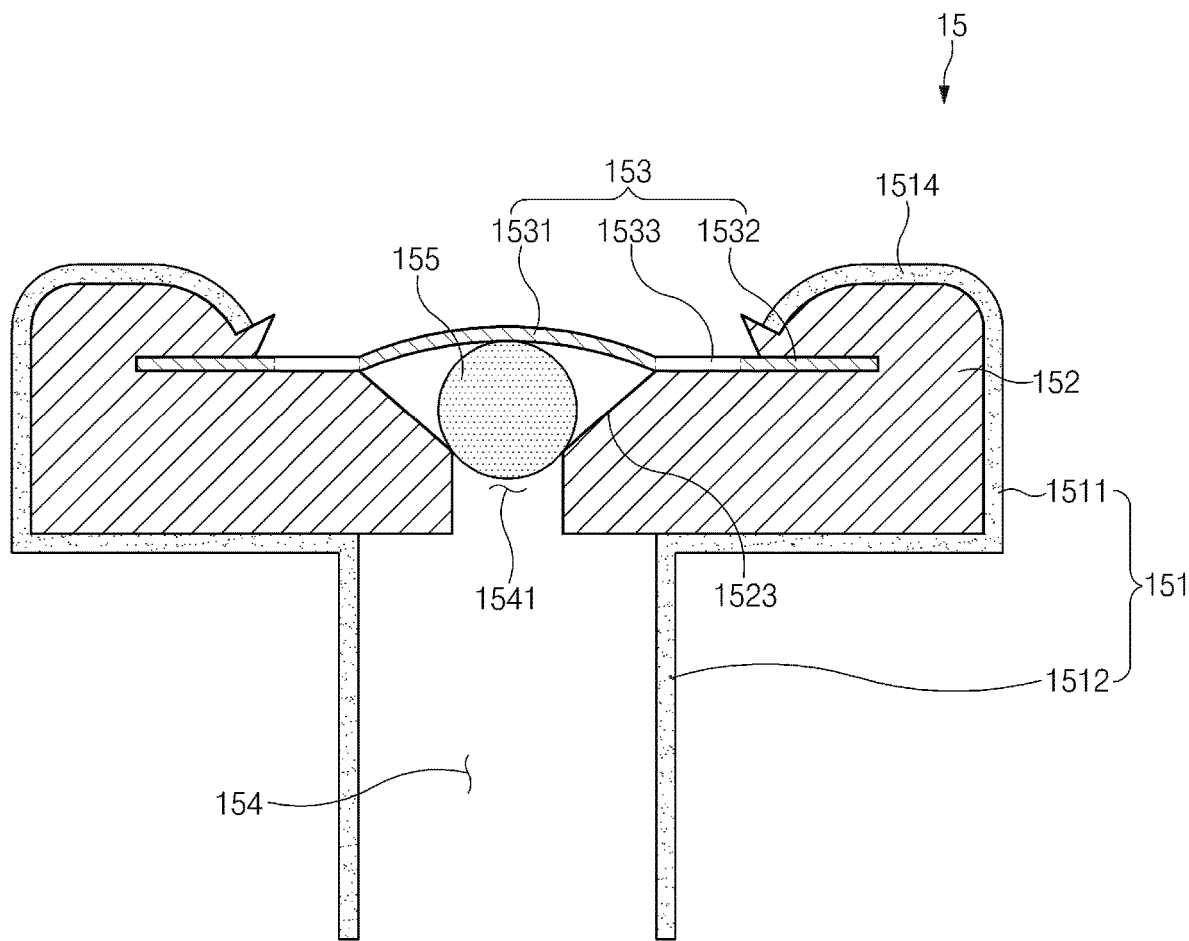
FIG. 14 is a lateral cross-sectional view of the venting device according to an embodiment of the present invention.

FIG. 13 is a lateral cross-sectional view illustrating a state in which crimping is performed on the crimping part 1514 formed on the upper end of the housing 151 according to an embodiment of the present invention, and FIG. 14 is a lateral cross-sectional view of the venting device 15 according to an embodiment of the present invention.

When the gasket 152 is inserted into the insertion space 1513 of the housing 151, the crimping part 1514 formed on the upper end of the housing 151 is crimped (S504). Here, in order to prevent insulation from being deteriorated, it is preferable that the gasket 152 is crimped by a mechanical process rather than being chemically or thermally treated. For this, as illustrated in FIG. 13, a crimping jig 4 descends from an upper side to press the crimping part 1514 formed on the upper end of the housing 151.

A bottom surface of the crimping jig 4 has a curved surface that is recessed inward. Thus, the crimping jig 4 induces the crimping part 1514 of the housing 151 so that the crimping part 1514 is bent toward a center of the housing 151. As a result, as illustrated in FIG. 14, the crimping part 1514 may be bent together with the gasket 152, and thus, the crimping part 1514 and the gasket 152 may seal the outer surface of the plate spring 153. Here, as described above, the gas exhaust hole 1533 is punched in the peripheral portion 1532 of the plate spring 153. Thus, it is preferable that the crimping part 1514 is crimped by pressing the peripheral portion 1532 except for the gas exhaust hole 1533 so as not to shield the gas exhaust hole 1533 of the plate spring 153.

Figure 15:
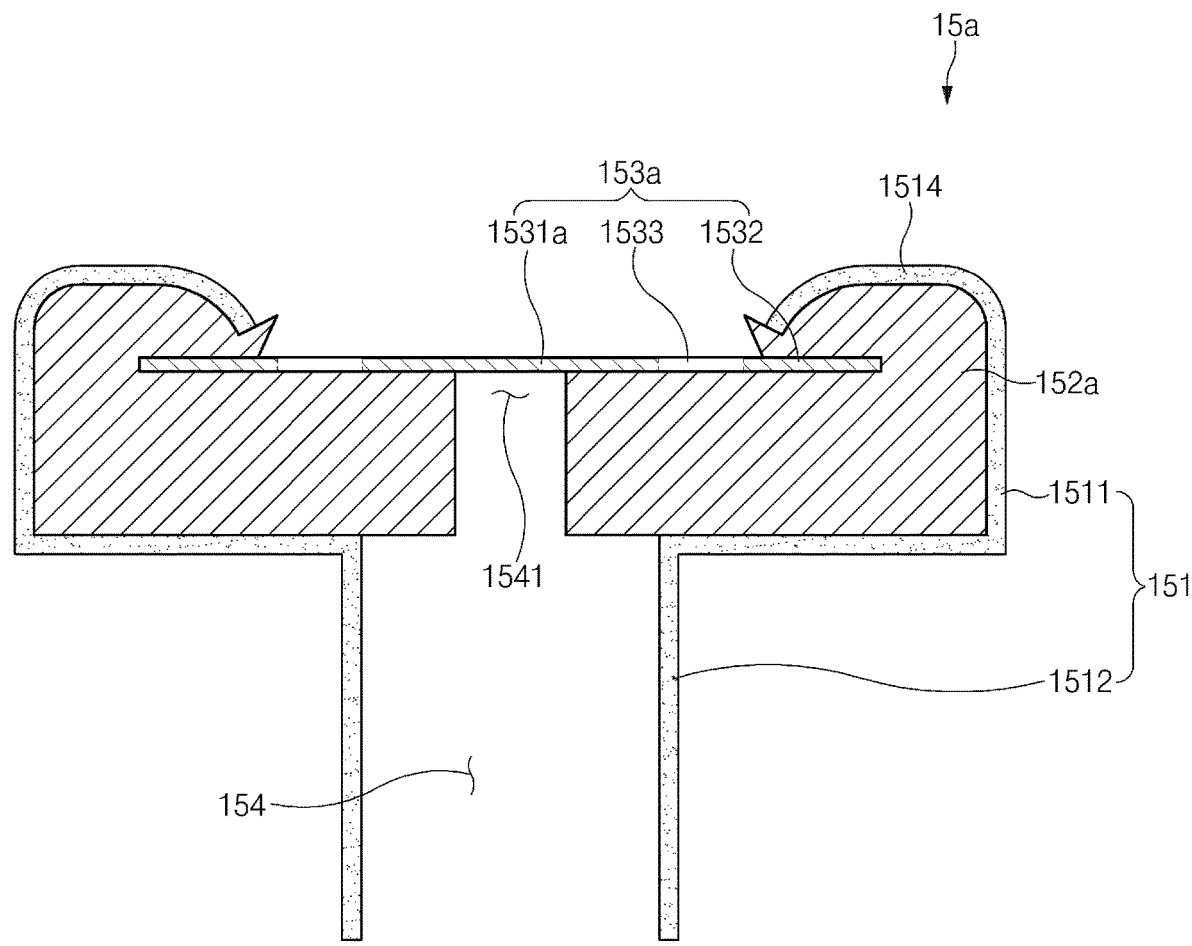
FIG. 15 is a lateral cross-sectional view of a venting device according to another embodiment of the present invention.

FIG. 15 is a lateral cross-sectional view of a venting device 15a according to another embodiment of the present invention.

According to an embodiment of the present invention, the ball 155 is disposed between the gasket 152 and the plate spring 153. Thus, the ball 155 together with the plate spring 153 opens and closes the outlet of the passage 154. However, as described above, the venting device 15 has to be miniaturized so as to be inserted into the sealing part 134 of the secondary battery 1. As technologies are gradually developed, electronic products are miniaturized, and the secondary batteries 1 installed in such electronic products are also miniaturized together. Thus, it is important to simplify the structure of the venting device 15 as much as possible and to reduce a size of the venting device 15.

According to another embodiment of the present invention, in order to more simplify a structure of the venting device 15a, the ball 155 is removed as illustrated in FIG. 15. That is, other constituents are not provided between a gasket 152a and a plate spring 153a. Thus, according to another embodiment of the present invention, the venting device 15a may be more simplified in structure to more reduce a size thereof.

When a gas is generated in a pouch to gradually increase in internal pressure of the pouch and thus exceed a specific pressure, the gas directly pushes the plate spring 153a without using the ball 155. Also, the plate spring 153a may be spaced apart from the gasket 152a to open an outlet 1541 of a passage 154, and the gas within the pouch may be discharged to the outside through the passage 154 and a gas exhaust hole 1533.

The gas within the pouch is sufficiently discharged to the outside, and thus, the internal pressure of the pouch decreases again. As a result, while the pressure of the gas, which pushes the plate spring 153a, decreases, the plate spring 153a returns to its original position by elasticity thereof. Also, the plate spring 153a contacts the gasket 152a again at the outlet 1541 of the passage 154 to close the outlet 1541 of the passage 154 without using the ball 155.

According to another embodiment of the present invention, since the ball 155 is not provided, a central portion 1531a of the plate spring 153a is formed in a flat shape without being bent upward as illustrated in FIG. 15. Also, an edge of an inner circumference of the passage 154 of the gasket 152a may not be chamfered or filleted. Thus, according to another embodiment of the present invention, since the process of bending the central portion 1531a of the plate spring 153a and the process of chamfering or filleting the edge of the inner circumference of the passage 154 of the gasket 152a are omitted, a method for manufacturing the venting device 15a may be simplified.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A venting device inserted into a sealing part of a pouch of a secondary battery, the venting device comprising:
   a housing inserted between confronting surfaces of the sealing part so as to be sealed together with the sealing part, the housing being made from a single continuous metal plate, the housing comprising an upper housing and a lower housing, the upper housing and the lower housing having shapes or sizes different from each other, the upper housing and the lower housing being adjacent portions of the single continuous metal plate;
   a gasket made of a single continuous polymer and disposed in the housing and through which a passage is defined providing gas communication between an inside and an outside of the pouch, the gasket comprising a lower gasket through which the passage passes and an upper gasket having an outer diameter that is the same as an outer diameter of the lower gasket, the upper gasket extending upward from the lower gasket, the upper gasket having a thickness that is smaller than a thickness of the lower gasket, the lower gasket and the upper gasket being adjacent portions of the single continuous polymer; and
   a plate spring made of a metal, the plate spring being disposed in the housing and assembled with the gasket, the plate spring being configured to open and close the passage in response to a change in an internal pressure of the pouch,
   wherein the housing comprises a crimping part crimped together with the gasket on an upper end of the housing, the upper gasket being crimped together with the crimping part.

2. The venting device of claim 1, wherein the plate spring comprises:
   a central portion formed at a center of the plate spring; and
   a peripheral portion extending outward from the central portion,
   wherein a gas exhaust hole is punched in the peripheral portion.

3. The venting device of claim 2, wherein the crimping part is crimped onto the peripheral portion of the plate spring.

4. The venting device of claim 1, further comprising a ball disposed between the gasket and the plate spring at an outlet-side of the passage, the ball being configured to open and close the passage, the ball having a lower position contacting the gasket and an upper position spaced apart from the gasket.

5. The venting device of claim 1, wherein the lower housing has a width less than a width of the upper housing, the width of the lower housing and the width of the upper housing being defined in a lateral direction perpendicular to a longitudinal flow direction of the passage defined through the gasket.

6. The venting device of claim 1, wherein the upper housing has a circular cylinder shape, and the lower housing has an oval cylinder shape.

7. The venting device of claim 6, wherein the gasket is inserted into the upper housing.

8. A venting device inserted into a sealing part of a pouch of a secondary battery, the venting device comprising:
   a housing inserted between confronting surfaces of the sealing part so as to be sealed together with the sealing part, the housing being made from a single continuous metal plate, the housing comprising an upper housing and a lower housing, the upper housing and the lower housing having shapes or sizes different from each other, the upper housing and the lower housing being adjacent portions of the single continuous metal plate;
   a gasket made of a single continuous polymer and disposed in the housing and through which a passage is defined providing gas communication between an inside and an outside of the pouch, the gasket comprising a lower gasket through which the passage passes and an upper gasket having an outer diameter that is the same as an outer diameter of the lower gasket, the upper gasket extending upward from the lower gasket, the upper gasket having a thickness that is smaller than a thickness of the lower gasket, the lower gasket and the upper gasket being adjacent portions of the single continuous polymer;
   a plate spring made of a metal, the plate spring being disposed in the housing and assembled with the gasket, the plate spring being configured to open and close the passage in response to a change in an internal pressure of the pouch; and
   a ball disposed between the gasket and the plate spring at an outlet-side of the passage, the ball being configured to open and close the passage, the ball having a lower position contacting the gasket and an upper position spaced apart from the gasket, wherein the housing comprises a crimping part crimped together with the gasket on an upper end of the housing, the upper gasket being crimped together with the crimping part, and wherein, in the gasket, an edge of an inner circumference of a surface of the outlet-side of the passage is chamfered or filleted, such that the chamfered or filleted edge extends at an oblique angle from the surface of the outlet-side of the passage to a surface of the inner circumference of the passage.

\* \* \* \* \*